US008750363B2

(12) United States Patent
Nentwig

(10) Patent No.: US 8,750,363 B2
(45) Date of Patent: Jun. 10, 2014

(54) METHODS AND APPARATUS FOR WEIGHTED EQUALIZATION

(75) Inventor: Markus Nentwig, Helsinki (FI)

(73) Assignee: Broadcom Corporation, Irvine, CA (US)

( * ) Notice: Subject to any disclaimer, the term of this patent is extended or adjusted under 35 U.S.C. 154(b) by 356 days.

(21) Appl. No.: 13/082,489

(22) Filed: Apr. 8, 2011

(65) Prior Publication Data

US 2012/0257667 A1 Oct. 11, 2012

(51) Int. Cl.
*H03H 7/30* (2006.01)
*H03H 7/40* (2006.01)
*H03K 5/159* (2006.01)

(52) U.S. Cl.
USPC ............................ 375/231; 375/229; 375/346

(58) Field of Classification Search
CPC ................................................. H04L 25/03057
USPC ......................................................... 375/346
See application file for complete search history.

(56) References Cited

U.S. PATENT DOCUMENTS

| | | | | |
|---|---|---|---|---|
| 7,079,576 | B2 | 7/2006 | Bologna et al. | 375/234 |
| 7,489,734 | B2* | 2/2009 | Vihriala | 375/260 |
| 2003/0043887 | A1* | 3/2003 | Hudson | 375/144 |
| 2003/0081670 | A1* | 5/2003 | Bologna et al. | 375/234 |
| 2003/0210741 | A1 | 11/2003 | Fimoff et al. | 375/232 |
| 2004/0042557 | A1 | 3/2004 | Kabel et al. | 375/260 |
| 2004/0240588 | A1* | 12/2004 | Miller | 375/340 |
| 2005/0041574 | A1* | 2/2005 | Wu et al. | 370/208 |
| 2005/0181741 | A1 | 8/2005 | Raj et al. | 455/73 |
| 2006/0291681 | A1* | 12/2006 | Klinkby et al. | 381/318 |
| 2009/0201796 | A1 | 8/2009 | Roberts et al. | 370/210 |
| 2010/0183054 | A1* | 7/2010 | Daly et al. | 375/219 |
| 2011/0029111 | A1* | 2/2011 | Sabin et al. | 700/94 |
| 2011/0058595 | A1 | 3/2011 | Skeet | 375/232 |
| 2011/0255586 | A1* | 10/2011 | Li et al. | 375/231 |
| 2012/0076193 | A1* | 3/2012 | Kolze et al. | 375/232 |

FOREIGN PATENT DOCUMENTS

| | | |
|---|---|---|
| EP | 2 096 814 A2 | 9/2009 |
| WO | WO 01/47200 A1 | 6/2001 |

OTHER PUBLICATIONS

"3rd Generation Partnership Project; Technical Specification Group Radio Access Network; Evolved Universal Terrestrial Radio Access (E-UTRA); User Equipent (UE) radio transmission and reception (Release 9)", 3GPP TS 36.101 V9.6.0, Dec. 2010, 189 pgs.
"Robust Peak Distortion Equalization", Moshe Salhov et al., IEEE 2004, 4 pgs.

\* cited by examiner

*Primary Examiner* — Erin File
(74) *Attorney, Agent, or Firm* — Stanton IP Law

(57) ABSTRACT

Systems and techniques for equalization of a response of a receiver. In one embodiment, a response of a device to a known signal is measured to generate a measured signal. A processor is operated to apply an initial weighting to the measured signal and the known signal. The processor is operated to iteratively perform the operations of constructing an equalizer based on the weighted signals, testing the performance of the equalizer on the measured signal, and adjusting weighting applied to the measured signal and the known signal, until the performance of the equalizer on the measured signal meets a predetermined criterion.

14 Claims, 12 Drawing Sheets

METHODS AND APPARATUS FOR WEIGHTED EQUALIZATION

FIELD OF THE INVENTION

The present invention relates generally to wireless communication. More particularly, the invention relates to improved systems and techniques for equalization of received radio signals.

BACKGROUND OF THE INVENTION

Interest in wireless communication, particularly personal wireless communication, increased more and more during the last few decades, and user demand for the ability to transmit and receive information wirelessly has proven insatiable. Driven by high and growing demand, developers and manufacturers are constantly seeking ways to increase the information that can be transmitted and received by network infrastructure and user equipment. Finding such ways poses increasing challenges, as the desire to communicate large volumes of information combines with a strong and growing desire to use smaller and lighter equipment. New techniques, such as the use of submicron CMOS process to implement radio receivers, frequently encounter problems such as the need to operate using lower supply voltages, new sources of noise, such as 1/f noise, and stricter requirements from radio standards such as LTE 20 MHz carrier aggregation that employ closely spaced frequencies and employ subcarriers to carry information such as operational information.

Receivers operating under such conditions are bound by numerous requirements. They need to accurately receive wanted signals that may comprise subcarrier information and they need to reject unwanted signals. Such requirements present a need for equalization, the adjustment of signal strength of varying frequencies. An equalizer needs to admit wanted frequencies and attenuate undesired frequencies, and needs to present characteristics required by the application in which it is used.

SUMMARY OF THE INVENTION

In its various aspects, the present invention recognizes the need for equalization that meets a number of criteria related to close spacing of frequencies and the use of subcarriers. Both close spacing of frequencies and the use of subcarriers them a high sensitivity to noise and the need to accurately reject unwanted signals. Orthogonal frequency division multiplexing (OFDM), for example, employs subcarriers which are affected by the peak vector errors at their respective frequencies, so equalization that properly attenuates extraneous signals near each of the frequencies used by subcarriers is highly desirable. The invention recognizes that many prior art equalization techniques that limit the integrated vector error over a signal bandwidth, such as least mean square equalization, do not properly deal with subcarriers, which may carry separate information at a number of different frequencies within a frequency band.

The invention additionally recognizes that out of band performance is important, and that an equalizer needs to properly attenuate signals at frequencies outside the wanted frequency band employed by the receiver with which it is used.

The invention further recognizes that significant processing power is available in many modern receivers, and that this processing power can be used to estimate characteristics of expected signals and that such estimates can be used to define the attenuation to be imposed on signals at various frequencies outside of, and near the edges of, the frequency band employed by the receiver. For example, the invention recognizes that information relating to the average out of band spectrum may be available and that this information can be used to refine equalization to optimize out of band attenuation.

The invention additionally recognizes that digital techniques may be used to compute attenuation needed for equalization, and that the processing power present in many modern receivers can be used to this end. The invention further recognizes that many processing demands are made on computational hardware present in many receivers, particularly small portable receivers which are subject to increasing demands to communicate more data in equipment of smaller size and using less power in order to maximize battery life. The invention therefore recognizes that computationally simple and robust equalization techniques are highly desirable.

A method according to a first embodiment of the invention comprises measuring a response of a device to a known signal to generate a measured signal, operating a processor to apply an initial weighting to the measured signal and the known signal, and operating a processor to iteratively construct an equalizer based on the weighted signals, test the performance of the equalizer on the measured signal, and adjust weighting applied to the measured signal and the known signal. In some embodiments of the invention, the iterative process may continue until, for example, the performance of the equalizer on the measured signal meets a predetermined criterion. In other embodiments of the invention, the iterative process may, for example, continue for a predetermined number of rounds of iteration.

An apparatus according to a second embodiment of the invention comprises a receiver producing a response to a test signal, a measurement device for measuring the receiver response to produce a measured signal, storage for storing the test signal and the measured signal, and a processor operative to apply an initial weighting to the measured signal and the known signal; and iteratively construct an equalizer based on the weighted signals, test the performance of the equalizer on the measured signal, and adjust weighting applied to the measured signal and the known signal. In some embodiments of the invention, the apparatus may continue the iterative process until, for example, the performance of the equalizer on the measured signal meets a predetermined criterion. In other embodiments of the invention, the apparatus may, for example, continue the iterative process for a predetermined number of rounds of iteration.

A receiver according to a third embodiment of the invention comprises a high power amplifier, a duplex filter, a low noise amplifier, an analog baseband filter, an analog to digital converter, and an equalizer configured to approximate an inverse of a response of the analog baseband filter over a wanted signal bandwidth of a received signal processed by the receiver. According to some embodiments, the receiver may be configured to generate equalization information through a loop-back testing procedure comprising injecting a known signal into the analog baseband filter, measuring a signal representing a response to the known signal at the analog to digital converter, applying an initial weighting to the known signal and the measured signal, and iteratively generating equalization information based on the weighted signals, testing the performance of an equalization conducted using the generated equalization information on the measured signal, and adjusting weighting applied to the measured signal and the known signal. In some embodiments of the invention the receiver may continue the iterative process until, for example, the performance of equalization on the measured signal meets a predetermined criterion. In other embodiments of the invention, the receiver may, for example, continue the iterative process for a predetermined number of rounds of iteration.

These and other embodiments and aspects are detailed below with particularity.

DETAILED DESCRIPTION OF THE PREFERRED EMBODIMENTS

An apparatus according to an embodiment of the present invention computes equalization weighting for each of a plurality of sub-bands based on a comparison between a reference signal and the measured response of the receiver to the reference signal.

Figure 1A:
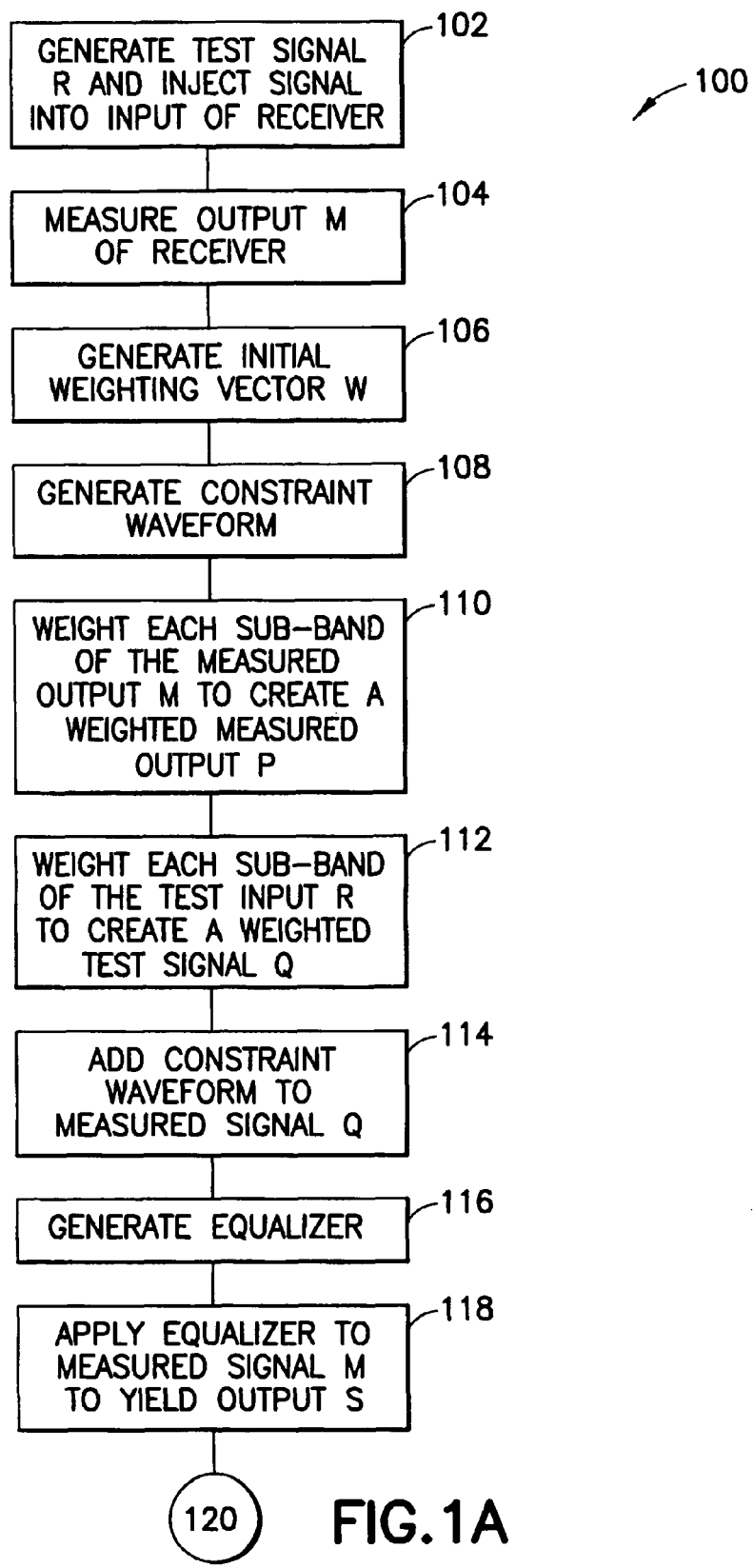
FIGS. 1A and 1B illustrate a process for constructing an equalizer according to an embodiment of the present invention.
Figure 1B:
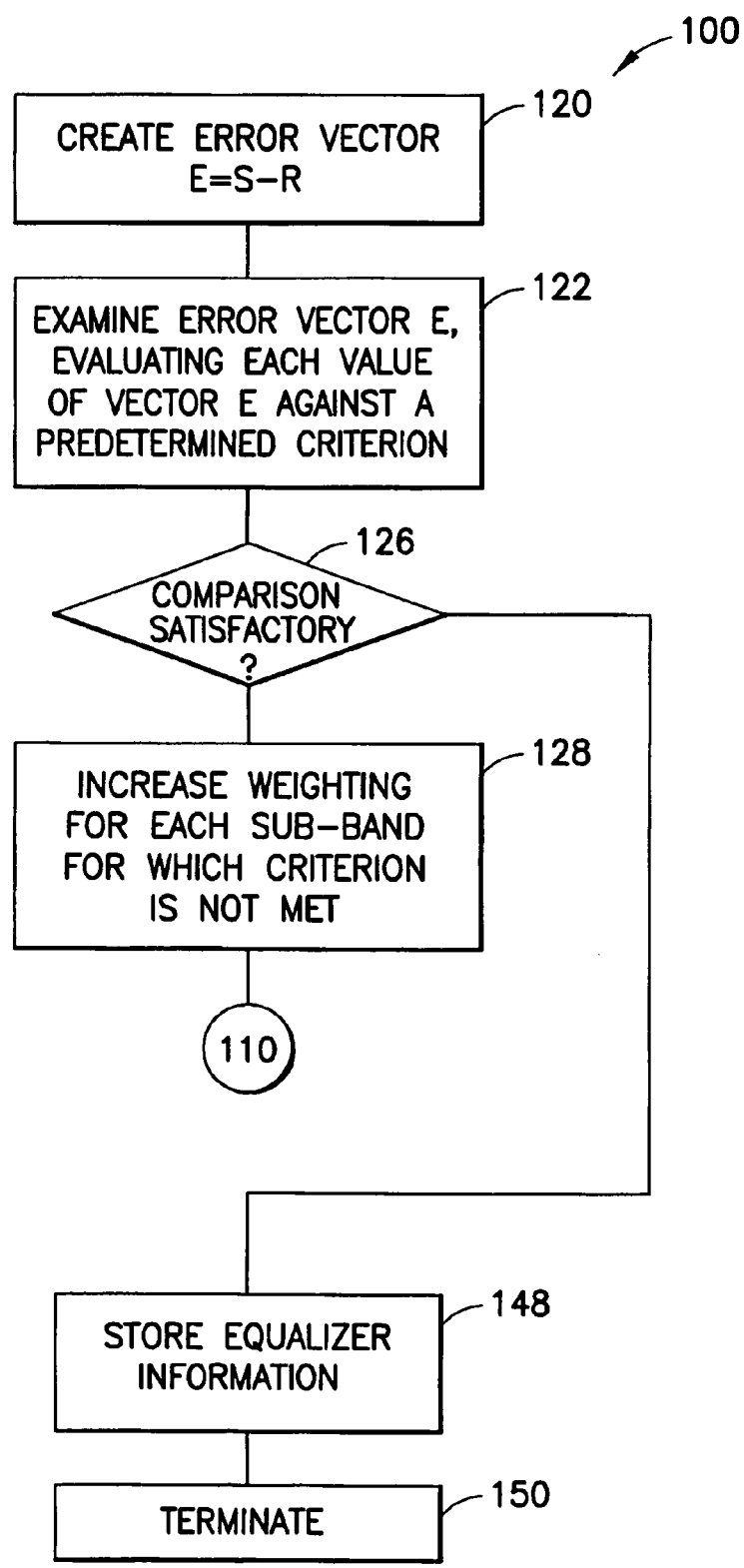

FIGS. 1A and 1B illustrate a process 100 of equalizer construction according to an embodiment of the present invention. The process 100 may be carried out using various components such as non-transitory computer readable memory, a processor executing instructions stored by the memory, communication and signal transmission equipment, and other suitable equipment for evaluating communication signals. It will also be recognized that numerous additional and alternative mechanisms may be used for carrying out a process such as the process 100, and that data processing operations, for example, may be carried out using a microprocessor and memory or any of a number of other forms of data processing hardware, such as dedicated circuitry designed for a particular task. Various specific exemplary and non-limiting apparatus for carrying out the process 100 are illustrated in subsequent figures and described in the discussion accompanying those figures.

At step 102, a test signal R is generated and injected into an input of a receiver. In one exemplary embodiment, the test signal may suitably be a stored test signal retrieved from memory.

At step 104, the output M of the receiver is measured. The output of the receiver may be averaged over a number of cycles to improve accuracy. In one example, the output of the receiver may suitably comprise a digital representation of a waveform produced by an analog baseband filter of the receiver and converted to digital form using an analog to digital converter, and will suitably represent a waveform comprising a number of sub-bands within a frequency band. A cyclic signal can be converted back and forth between time and frequency domains by using discrete Fourier transform (DFT)/inverse discrete Fourier transform (IDFT) processing.

At step 106, an initial weighting vector W is generated, for use in weighting the test signal and the measured receiver response. The initial weighting vector may simply assign the same weight to each sub-band, and for convenience may comprise an initial value of all 1s. The elements of the weighting vector may suitably represent a set of sub-band coefficients.

At step 108, a constraint waveform C is generated, based on expected noise power at each sub-band lying outside the frequency band of the desired receiver output. The waveform C may suitably be based on receiver specifications or estimates of out of band interferer spectrums. The use of the waveform C may be used to inform equalization so as to include an optimized stopband mask.

Next, at step 110, each sub-band of the measured output M is weighted with the vector W to produce a weighted measured signal P. Weighting may be accomplished using any suitable technique, such as discrete Fourier transform (DFT), per-element multiplication, inverse DFT (IDFT), or any other technique desired. One example of weighting the measured output M is to use the following formula:

$$J = \text{DFT}(M)$$

K=J*W, where W represents a set of weighting coefficients and K represents the multiplication of each element of J with a corresponding element of W.

$$P = \text{IDFT}(K).$$

At step 112, each sub-band of the test signal R is also weighted with the vector W to produce a weighted test signal Q.

The formula described above with respect to step 110 can be used:

$$J = \text{DFT}(R)$$

K=J*W, where W represents a set of weighting coefficients and K represents the multiplication of each element of J with a corresponding element of W.

$$Q = \text{IDFT}(K).$$

At step 114, the constraint waveform C is added to the weighted measured signal P, resulting in a sum signal.

At step 116, an equalizer is generated to yield the signal Q when P is supplied as an input, that is, to map the sum signal to the weighted test signal. The equalizer may suitably be a least mean squared (LMS) equalizer. The equalizer minimizes the total error, which consists of in-band error of the weighted test signal, that is, the vector distortion of the test signal, and the leakage through the equalizer of out of band signals represented by the constraint waveform. Because the in-band and out-of-band signals occupy different frequencies, they are orthogonal and do not interact with one another other than through contributing to LMS error.

At step 118, the equalizer is applied to the measured signal M, yielding an output S. Note that at this step, equalizer is applied to the unweighted signal M, not the weighted signal Q. As will be seen from the discussion below, the construction and refinement of the equalizer is directed toward yielding the reference signal R from an input of the measured signal M. A perfect receiver, supplied with an input signal R, would yield an output signal substantially identical to the input signal R, and the construction of the equalizer according to this exemplary embodiment of the invention is directed to removing discrepancies between the actual measured signal M and the reference signal R that was processed by the receiver to yield the output M.

At step 120, an error vector E is created by subtracting R from S, so that E=S−R.

It will be remembered that the signals described here are all representations of power levels of different sub-band frequencies, so that the error vector E is a set of error values representing a sub-band-by-sub-band set of values. At step 122, the error vector E is examined, and each value comprising the vector E is compared against a predetermined criterion. An exemplary criterion is whether the absolute value of an error exceeds a maximum.

At step 126, the result of the comparison is evaluated against a predetermined criterion to determine if the performance of the equalizer is satisfactory. One criterion might be that the error value does not exceed a maximum for any sub-band. If the evaluation indicates success, the process skips to step 148, the data representing the equalizer is stored, and the process terminates.

If the evaluation does not indicate success, the process proceeds to step 128 and, for each sub-band failing to meet the criterion, the corresponding weighting value of the weighting vector W is increased. One exemplary choice for the degree of increase is to increase the weighting by the ratio of the error value to the maximum error value, multiplied by some factor. For example:
if $W_k=W_1, W_2, \ldots, W_n$,
then for each k where $|e|_k$ exceeds the maximum allowable value $e_{max}$, $$W_k=|e|_k/e_{max}*1.05.$$

After weightings have been updated, the process then returns to step 110 and another iteration of steps 110-126 is performed. In each successive iteration, the input signal P represents more energy in each sub-band for which weighting has been increased, so that the contribution of each such sub-band to the least mean squared error is increased. The next stage of equalizer design is thus forced to improve accuracy at each sub-band frequency for which the weighting has been increased.

The process 100 thus employs a single test signal and a single measurement of a receiver output in response to the test signal and constructs an equalizer exhibiting desired performance through an iterative process that weights test signal and receiver output values, designs a simple equalizer based on those values, tests the equalizer, and performs further weighting based on the outcome of the testing.

Figure 2:
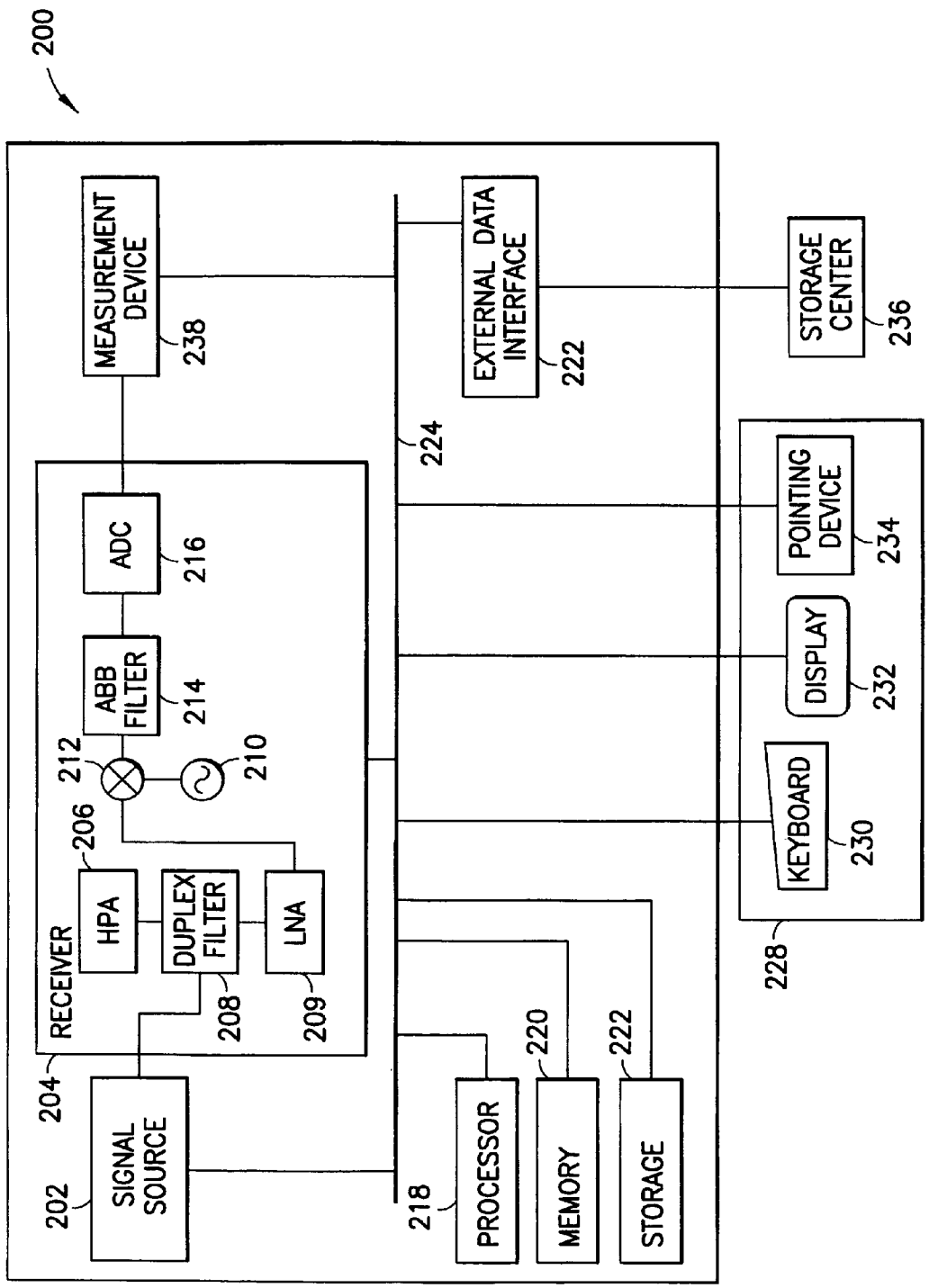
FIG. 2 illustrates an apparatus for constructing an equalizer according to an embodiment of the present invention.

FIG. 2 illustrates a system 200 for generating equalization parameters according to an aspect of the present invention, using a process similar to that of the process 100 of FIGS. 1A and 1B. The system 200 is presented here as a system dedicated to generating equalizer parameters, rather than for communicating using an equalizer constructed according to embodiments of the present invention, but it will be recognized that a receiver or transceiver using equalization systems and techniques according to embodiments of the present invention may construct and update equalization information while being used in communication or between communication, and an example of such receivers or transceivers is presented below.

The system 200 suitably comprises a signal source 202 for generating a known test signal and a receiver 204 for generating a response to the test signal. The receiver 204 suitably has similar characteristics to receivers that do or will employ equalization according to one or more embodiments of the present invention, and the signal source 202 suitably generates a test signal having characteristics reflecting a communication environment in which such receivers operate. Numerous signal sources such as the signal source 202 and numerous receiver components such as the receiver 204 may be employed, with equalization parameters being generated that are appropriate for the particular test signal being used and the response of the particular receiver component to the test signal. Alternatively or in addition, the signal source 202 and the receiver 204 may be programmable or adjustable so as to produce test signals and responses to test signals representative of any of numerous receivers and the communication environments in which they operate.

The receiver 204 may suitably include components such as a high power amplifier 206, a duplex filter 208, a low noise amplifier 209, an oscillator 210, a mixer 212, an analog baseband (ABB) filter 214 and a digital to analog converter 216, to convert a response signal produced in response to the test signal to digital form for processing and analysis. The receiver 204 may also include multiple branches, such as an in phase branch and a quadrature branch, but for purposes of the immediate discussion, only one set of receiver components are shown here. The specific components of any particular receiver are not important for the general concept of generating equalization information; what is important is that a receiver used in the generation of equalization information be reflective of a receiver that will use the equalization information once it has been generated.

The signal source 202 may suitably be controlled by a processor 218 having access to a memory 220 and long term storage 222, communicating with one another and with other components of the apparatus over a bus 224. Either or both of the memory 220 and long term storage 222 may store one or more desired test signals and may also store a set of instructions executable by the processor 218 to generate a desired test signal. The system 200 may also include an external data interface 226 to allow new data to be received or data such as generated equalization information to be provided to external data processing or storage devices, for example, devices that may be used to supply the generated equalization information to receivers to use it in the manufacture of new receivers. The system 200 may also include a user interface 228, suitably including one or more components such as a keyboard 230 and display 232, which in one or more exemplary embodiments may be a touch screen display, and pointing device 234, to give a user or operator the ability to provide information or commands relating to the generation of equalization information. For example, an operator may be provided with the ability to intervene in the process of generating equalization information or may direct the transfer of information such as new test signal data or newly generated equalization information to a centralized storage center 236 for distribution to user equipment.

In one exemplary and non-limiting embodiment, the signal source 202 is controlled by the processor 218 to generate a cyclic test signal, which is supplied to the receiver 204, either as a wireless or wired signal depending on the particular needs of the operation being performed. The receiver 204 produces an output in response to the test signal, and this output is measured by a measurement device 238, and the measurement signal stored. The test signal itself is also stored for comparison against the receiver output and various waveforms resulting from computations made using the receiver output, as will be seen in greater detail below.

The processor 218 performs operations similar to the steps of the process 100 of FIGS. 1A and 1B. Specifically, once the test signal has been generated and the measurement taken, the processor 218 constructs a weighting vector and a constraint waveform, and iteratively weights the test and measured signals, constructs an equalizer, applies the equalizer to the measured signal, determines and evaluates the error, and increases the weighting.

Figure 3:
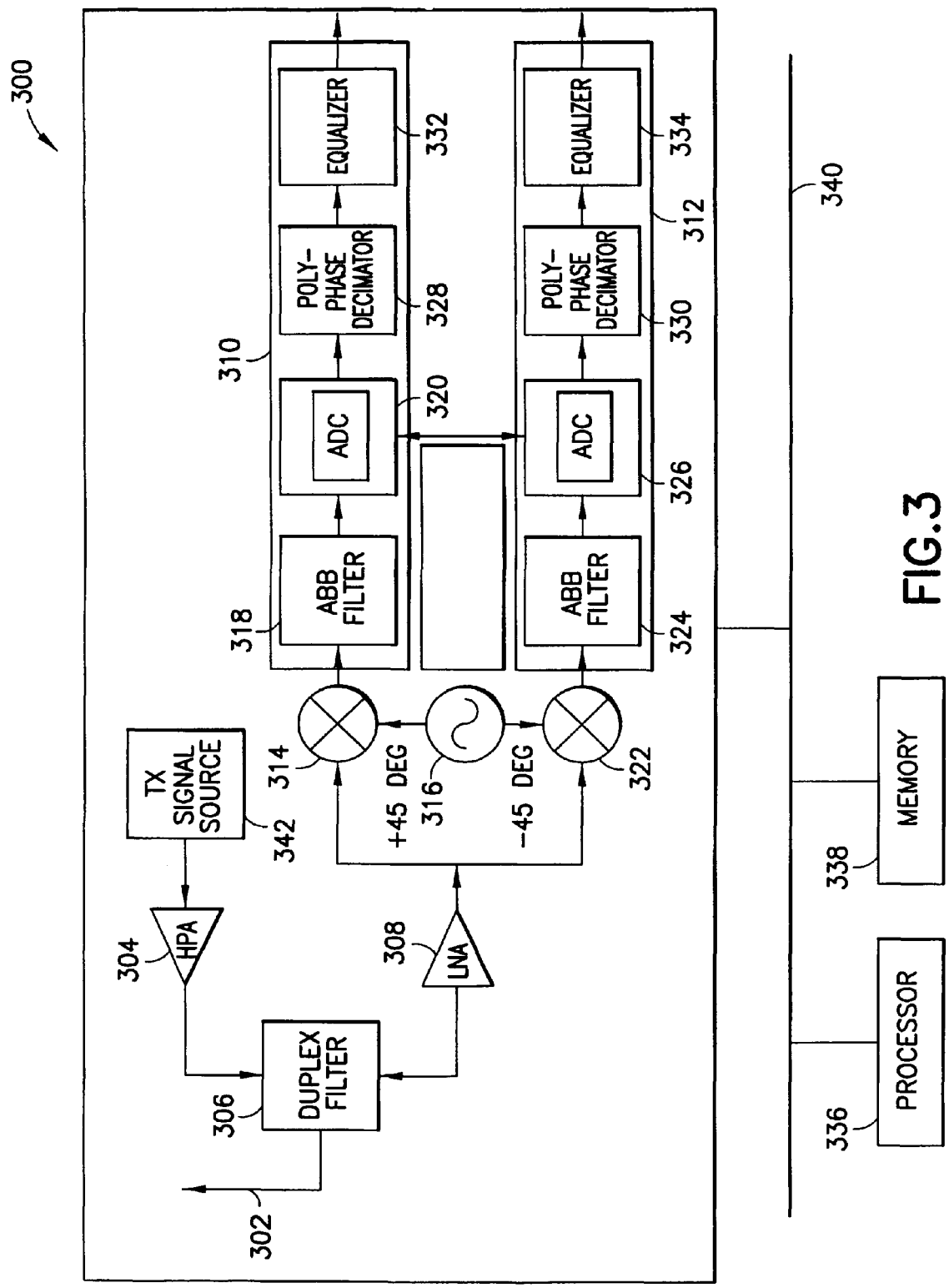
FIG. 3 illustrates a receiver using and constructing or updating an equalizer according to an embodiment of the present invention.

FIG. 3 illustrates a receiver 300 according to an aspect of the present invention. The receiver 300 employs an equalizer suitably constructed using a process similar to the process 100 of FIGS. 1A and 1B, and is able to generate and update equalization information during the operation of the receiver 300 using loopback testing. The various components of the receiver 300 are illustrated here separately for the sake of clarity, with one component shown for each function being performed, but it will be recognized that functions or combinations of functions may be performed by the components shown or by different components, and that multiple functions may be performed by a single component. For example, processing of signals may be performed by a processor operating under the control of instructions stored in memory, and various processing elements may be implemented by this or other suitable mechanisms.

The receiver 300 may suitably receive signals transmitted through an antenna 302, and may include a high power amplifier 304, a duplex filter 306, and a low noise amplifier (LNA) 308. An output of the low noise amplifier 308 is fed into phase branch 310 of the receiver 300 and quadrature branch 312 of the receiver 300. In the in phase branch 310, a first mixer 314 combines the output of the low noise amplifier 308 with an output of an oscillator 316 to create an in phase signal which is fed to a first analog baseband (ABB) filter 318. The ABB filter output is supplied to a first analog to digital converter (ADC) 320. Similarly, in the quadrature branch 312, a second mixer 322 combines the output of the low noise amplifier with an output of the oscillator 316 to create a quadrature signal which is fed to a second ABB filter 324. This ABB filter output is supplied to a second analog to digital converter (ADC) 326.

The outputs of the analog to digital converters 320 and 326 may suitably be supplied to poly-phase decimators 328 and 330, so as to allow downstream processing at a reduced sampling frequency as compared to the ADCs 320 and 326.

The output of the poly-phase decimators 328 and 330 may be subjected to equalization according to an exemplary embodiment of the present invention by equalizers 332 and 334. The equalizers 332 and 334 are shown here as distinct components for clarity of illustration, but it will be recognized that the equalizers 332 and 334 may be implemented using digital techniques through the operation of a processor 336 operating under the control of instructions residing in a memory 338, communicating with one another and with other components of the receiver 300 over a bus 340, and information defining the operation of the equalizers 332 and 334 may reside in memory 338.

Figure 4A:
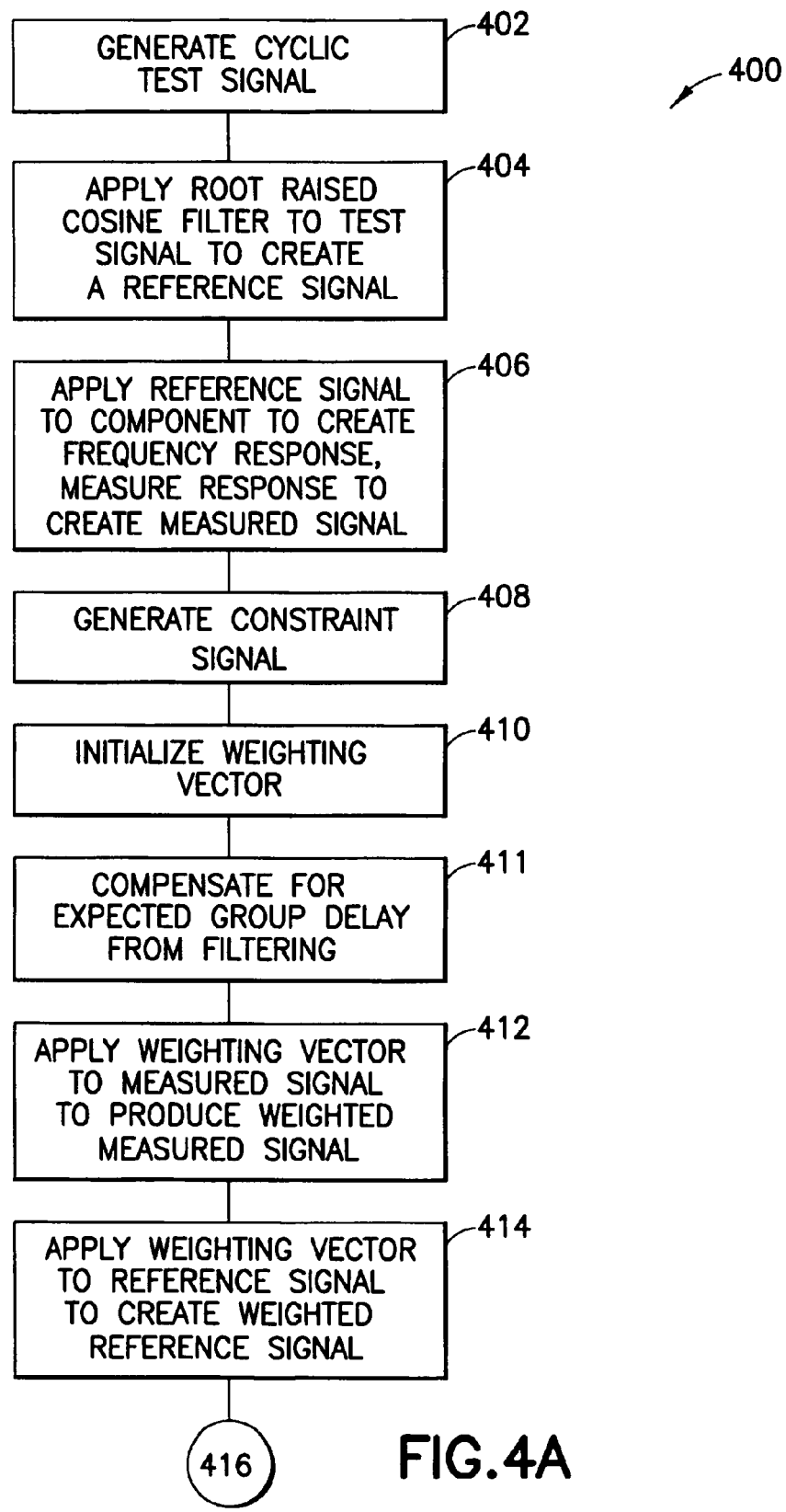
FIGS. 4A-4C illustrate a process for constructing an equalizer according to an embodiment of the present invention.
Figure 4B:
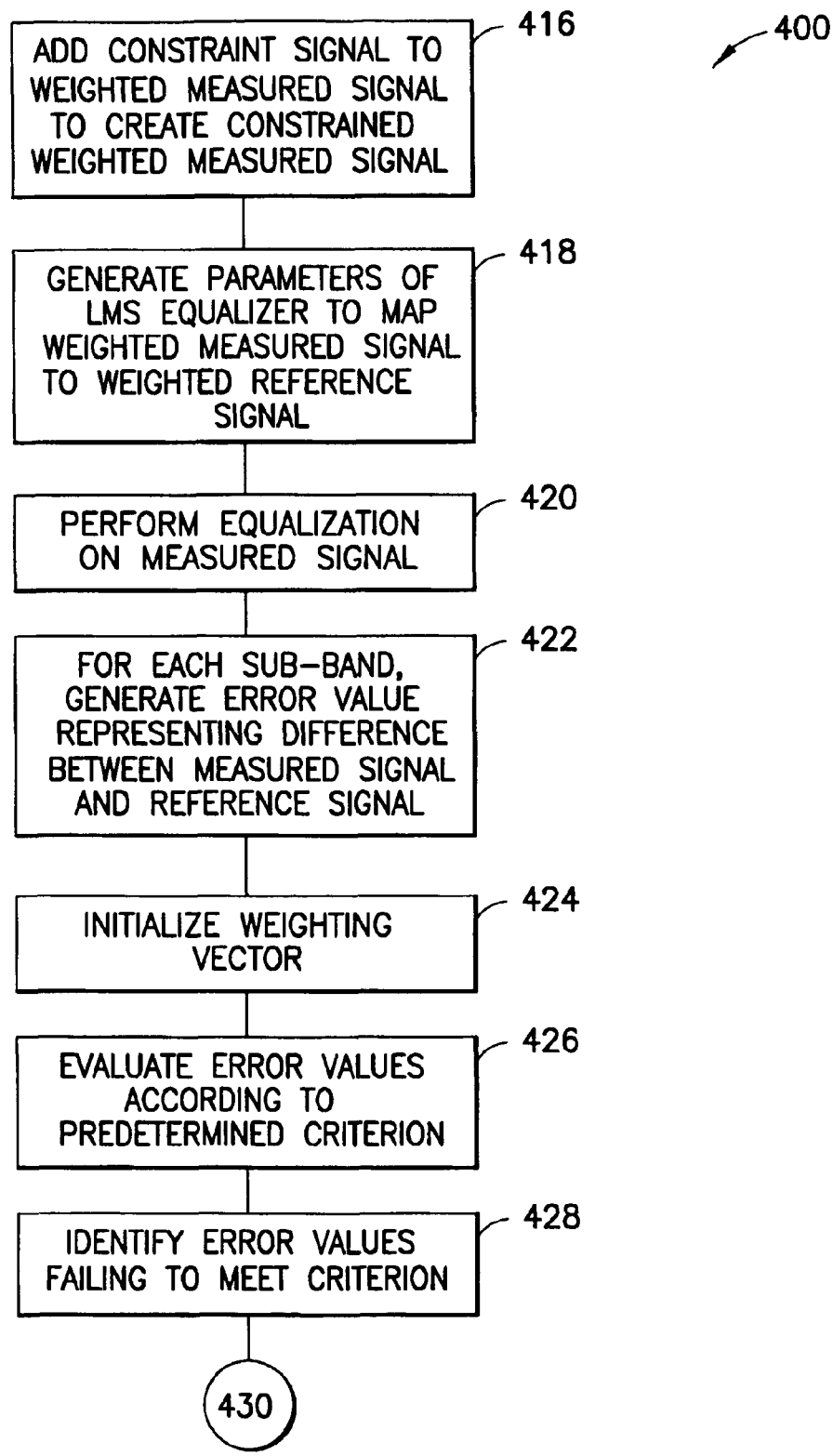
Figure 4C:
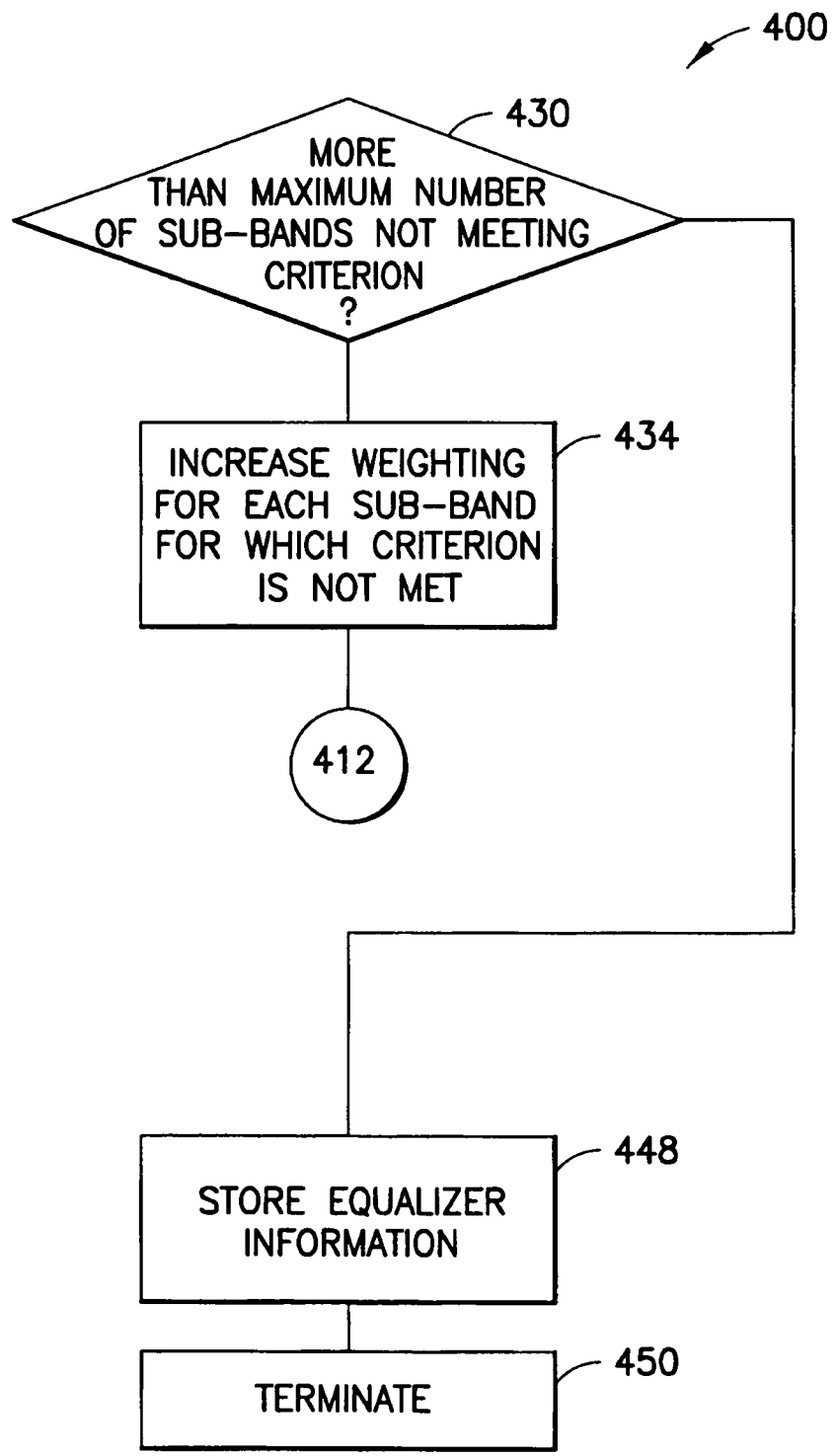

The equalizers 332 and 334 employed by the receiver 300 are constructed using iterative techniques similar to those of the process 100 of FIGS. 1A and 1B, and are designed based on the needs of the environment in which the receiver 300 operates. The equalizer parameters may have been previously generated and designed into or stored in components of the receiver 300, but the receiver 300 may also have the capability of constructing the equalizers 332 and 334 through loopback testing. Suitably, a test signal provided by a signal source 342 is applied to the high power amplifier 304. The test signal may be constructed based on signal data stored in memory 338. Alternatively, signal source 342 may generate the test signal using other means to deterministically generate a signal, for example using a pseudo-random generator with predetermined seed values and coefficients. The test signal passes through the high power amplifier 304, duplex filter 306, and low noise amplifier 308, and passes through the mixers 314 and 322 to form in phase and quadrature components, which pass through the ABB filters 318 and 324 and are processed by the ADC converters 320 and 326. The output of ADC converters 320 and 326 is processed by poly-phase decimators 328 and 330. The outputs of the poly-phase decimators 328 and 330 are stored in memory 338 as measured signals, and the test signal and measured signals are processed to form the equalizers 332 and 334. One particular exemplary embodiment of a process used to form equalizers such as the equalizers 332 and 334 is illustrated in FIGS. 4A-4C and discussed below.

The receiver 300 may suitably operate in the long term evolution 20 MHz mode, which imposes particular demands on operation. The desired signal has a relatively wide bandwidth, and as a result it is difficult to suppress unwanted signal energy on nearby frequencies. Such signal energy may appear, for example, in the form of adjacent channels, in-band blockers, and frequency division duplex (FDD) transmit leakage. Unwanted transmit leakage appears at a relatively low frequency offset in the receive path.

One approach to suppression of unwanted signal energy is to take a relatively aggressive approach to hardware filtering, implementing filters that provides strong rejection of unwanted components. However, if ABB filters such as the filters 318 and 324 are designed so as to provide such aggressive rejection of nearby frequencies, the filtering they provide is likely to cause amplitude ripple and group delay ripple in the wanted signal. In addition, cost constraints needed for a cost optimized high volume product may render it difficult to implement any filter design for the ABBs 318 and 324 that will provide sufficient suppression to bring the transmit leakage down to the thermal noise floor.

These and various other additional difficulties are encountered and solved by a receiver such as the receiver 300, implementing systems and techniques according to various embodiments of the present invention. For example, in some circumstances it may be desired to use ADCs that perform sampling at a relatively low rate, and sampling at such a rate may allow alias products of input tones. In addition, requirements for dealing with adjacent channels and the particular operation of the receiver 300 typically impose a requirement to adequately suppress adjacent channels at some stage before the output of the receiver 300. The output of receiver 300 may be identical to the output of equalizers 332 and 334. Implementation of equalization using embodiments of the techniques described above provides solutions to these and other problems. For example, one embodiment of the invention provides for an inverse of the filtering performed on the wanted signal, that is, the passband of the filter. In this way, ripple introduced by a filter that provides sufficient rejection of nearby signals is canceled out. Adaptation of equalization to the measured signal as actually encountered automatically adapts processing of the received signal to the choice and implementation of hardware such as the filters 318 and 324.

FIGS. 4A-4C illustrate a more detailed embodiment of a process similar to the process 100 of FIGS. 1A and 1B. At step 402, a cyclic test signal is generated, characterized by equal power over all frequencies of a wanted frequency band of a receiver operating a 3G WCDMA mode, and zero power at frequencies outside the wanted frequency band. Convenient characteristics for the test signal are a sampling frequency of 7.68 MHz and a length of 2048 samples. The test signal may suitably have the spectral shape of a wideband code division multiple access signal. At step 404, a root raised cosine filter is applied to the test signal to create a reference signal.

At step 406, the reference signal is applied to a suitable component to produce a frequency response. Examples of such a component are the ABB filters 318 and 324 of FIG. 3. The frequency response is measured to create a measured signal.

At step 408, a constraint signal is generated. The constraint signal may suitably be based on characteristics of an expected operating environment. In one exemplary environment, a received signal may be expected to include unwanted components in neighboring channels having a constant power spectral density at a filter. In addition, GSM blockers may be present, operating at 2.6 or 2.7 MHz and a bandwidth of +135 to −135 kHz. The constraint signal is preferably limited to frequencies beyond the operating channel of the receiver.

At step 410, a weighting vector is initialized. In one exemplary embodiment, a weighting vector may be created with a value of 1 for each subfrequency within a wanted frequency band, that is, an in-band range, and a value of 0 for each subfrequency out of the wanted range. At step 411, a constant group delay expected to be introduced by filtering components used in the receiver is compensated by matching the output signal to the reference signal. Matching the output signal to the reference signal may comprise applying a cyclic time shift or a phase shift that is linearly dependent on frequency, to at least one of the output signal and the reference signal, for example.

Next, at step 412, the weighting vector is applied to the measured signal to create a weighted measured signal, including creating time and frequency domain components of the weighted measured signal, and at step 414, the weighting vector is applied to the reference signal to create a weighted reference signal, similarly creating time and frequency domain components of the weighted reference signal. At step 416, the constraint signal is added to the weighted measured signal to create a constrained weighted measured signal, creating time and frequency domain components of the constraint signal and adding these components to the corresponding components of the weighted measured signal.

At step 418, parameters of a least mean squared equalizer, to take a convenient exemplary implementation, are generated to map the constrained weighted measured signal to the weighted reference signal.

At step 420, equalization is performed on the measured signal, and at step 422, for each sub-band, an error value is generated representing the error between the measured signal and the reference signal. At step 426, the error values are compared to a predetermined criterion and at step 428 the sub-bands for which the error values do not meet the criterion are identified. The criterion may be, for example, that an error value does not exceed a maximum. Such a maximum may be the same for all sub-bands, or maxima may be different for different sub-bands, with maxima being chosen according to the needs of the particular design being implemented.

In one exemplary embodiment, only sub-bands within the wanted frequency range are evaluated against a specific criterion, while signals at frequencies outside the wanted range are simply evaluated to determine if they have been sufficiently attenuated.

At step 430, the result of the evaluation is examined to determine if more than a maximum number of sub-bands exist for which the criterion was not met. If the number does not exceed the maximum, the process skips to step 448 and last set of equalization parameters is stored for use in operation. The process then terminates at step 450. If more than the maximum number of sub-bands do exist for which the criterion was not met, the process proceeds to step 434 and weighting values are increased for each sub-band. The process then returns to step 412.

Figure 5:
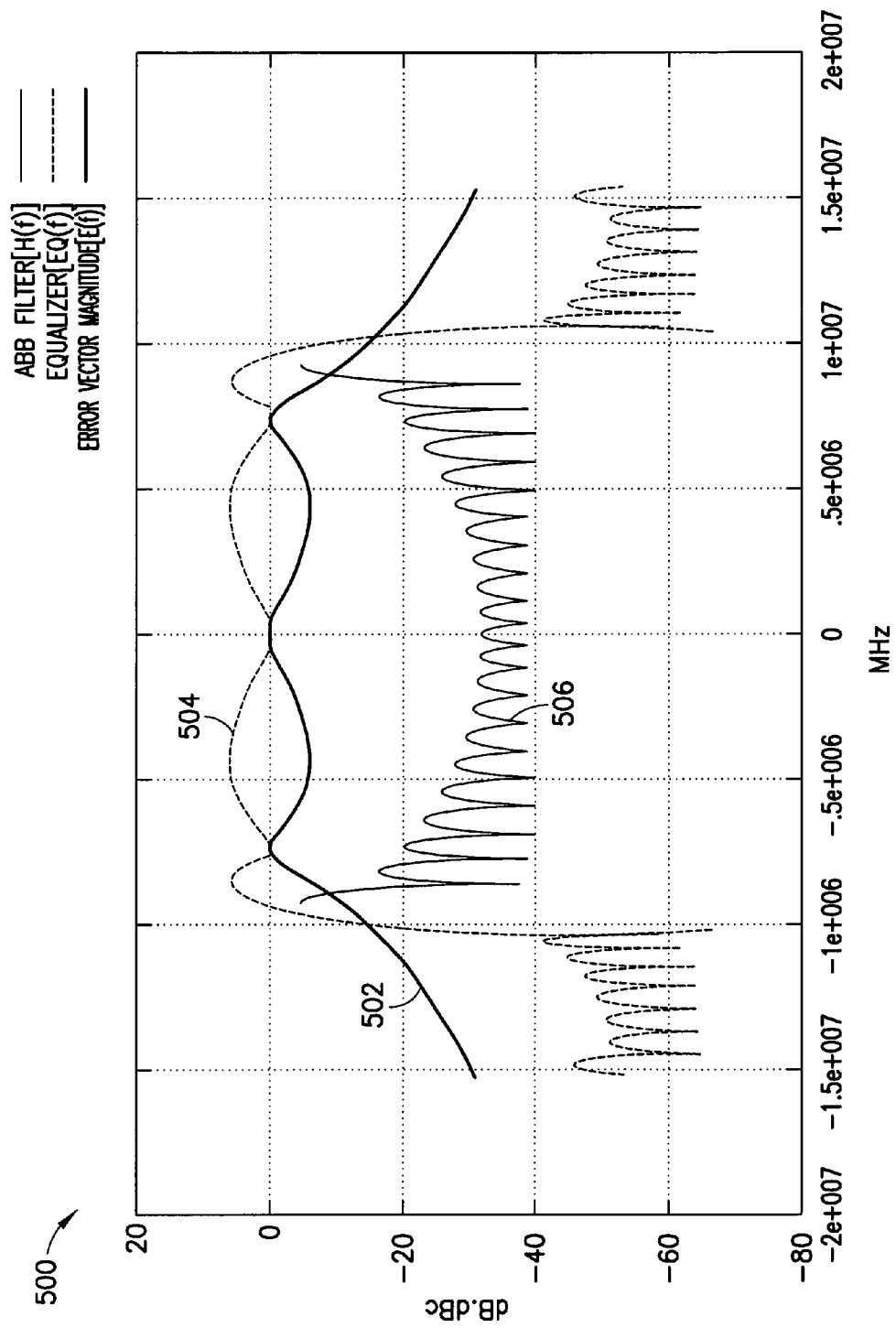
FIG. 5 illustrates a graph showing initial performance of an equalizer before iterative weighting according to an embodiment of the present invention.

FIG. 5 illustrates a graph 500 showing the performance of a constrained least mean squared equalizer on an exemplary filtered signal 502. Such an equalizer might be achieved, for example, by a process such as the process 100 at the point at which an equalizer is constructed to map the weighted measured signal to the weighted reference signal with the weighting vector being an initial vector of all ones. It can be seen that the filtered signal 502 shows a ripple effect. The least mean squared equalizer has been designed to map the signal 502 to an input signal, attenuating out of band signals and reducing in-band signal errors. The operation of the equalizer applies a frequency response 504 to the filtered signal 502, resulting in a filtered signal. Error 506 shows the magnitude of the errors of the filtered signal resulting from applying the equalizer frequency response 504 to the filtered signal 502. It can be seen from equalizer frequency response 504 that the unconstrained LMS equalizer achieves good stop-band rejection, but the error 506 reaches relatively high levels at frequencies near the edges of the wanted frequency region.

Figure 6:
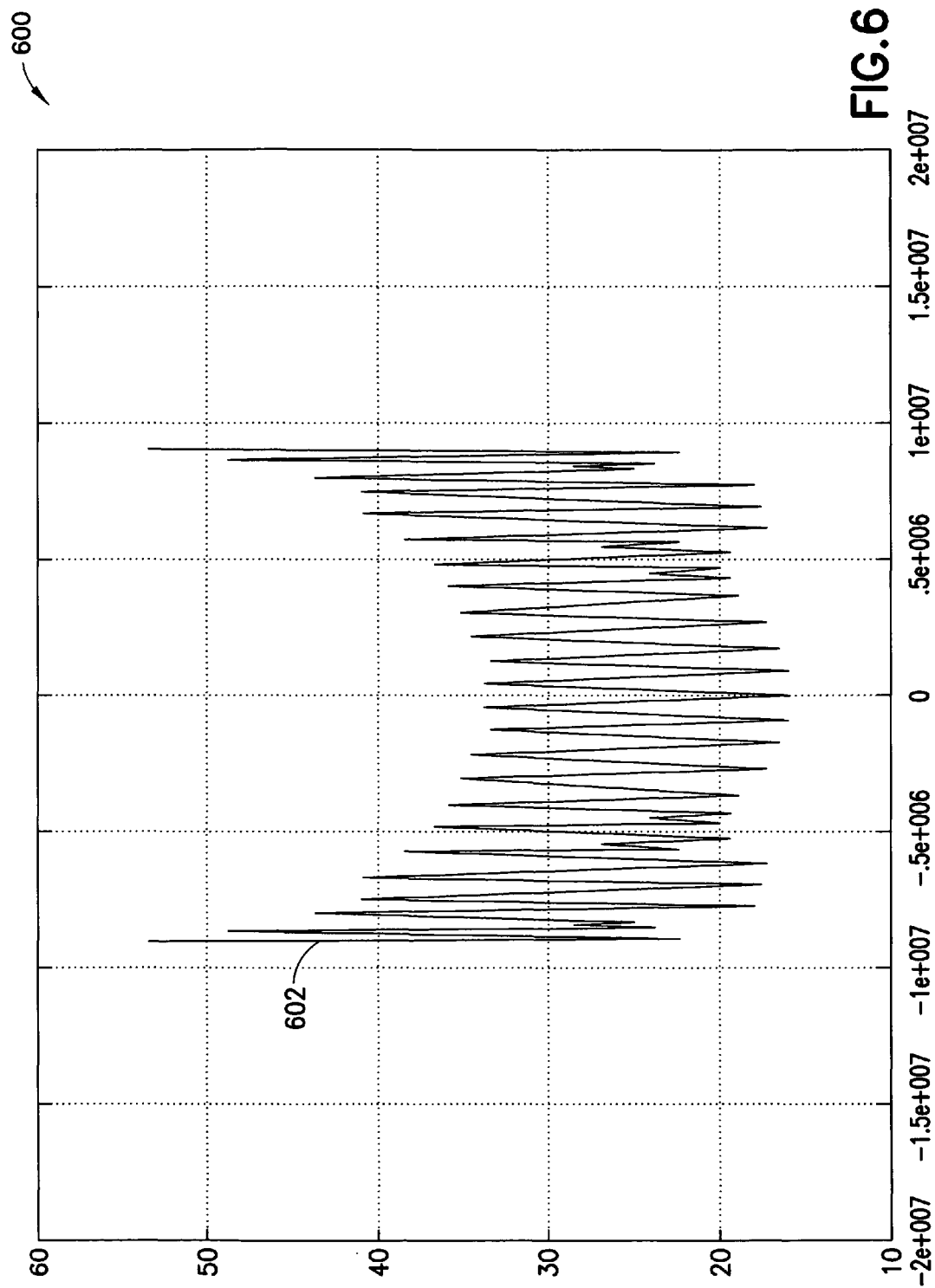
FIG. 6 illustrates a graph showing a weighting vector developed according to an embodiment of the present invention.

FIG. 6 illustrates a graph 600 showing a weighting vector 602 representing the weighting factor resulting from iterative adjustment of the equalizer represented by the waveform 504. The values represented by the vector 602 are approximately inverse to the values represented by the error waveform 506. This outcome is to be expected, because as noted above, the generation of equalization information according to various embodiments of the present invention increase the weight assigned to various sub-bands as errors at those sub-bands continue to exceed limits. A large initial error is likely to persist through multiple iterations, resulting in a progressively higher weight assigned to the sub-band exhibiting the error. Therefore, the initial error distribution across sub-bands is likely to result in a weighting vector showing a weighting magnitude approximately inverse to the initial error waveform.

Figure 7:
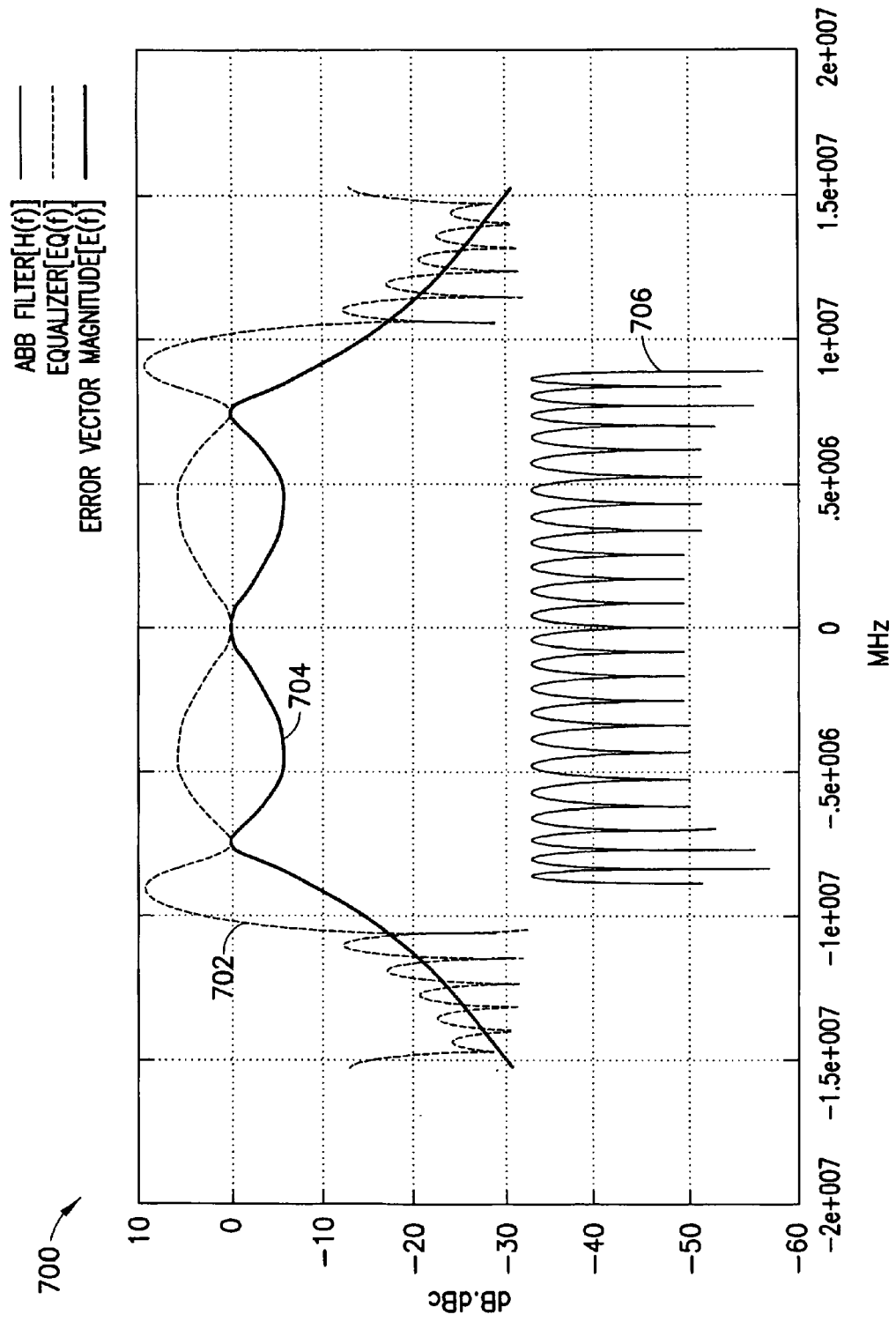
FIG. 7 illustrates a graph showing performance of a completed equalizer constructed according to an embodiment of the present invention.

FIG. 7 illustrates a graph 700, showing the error performance of an equalizer after conclusion of the progressive iterative adjustment characteristic of various embodiments of the present invention. The graph 700 shows a filtered signal 704, similar to the signal 502 of FIG. 5, an equalizer frequency response 702, and an error 706. It will be noticed that the error 706 does not show levels above −33 dBc at any frequency within a wanted signal bandwidth of 18 MHz. In other words, no single subcarrier is affected by an error greater than −33 dBc. In addition, the equalizer provides a notch in the out of band response with a width of 4.5 MHz at a center offset of 12.5 MHz to meet the performance requirements for adjacent channel rejection imposed by the LTE 20 MHz operating mode. The transition region between in-band and out-of-band frequencies exhibits a tolerable gain peak below 10 dB in frequency bands immediately adjacent to the wanted signal bandwidth, where no unwanted signals are expected.

Figure 8:
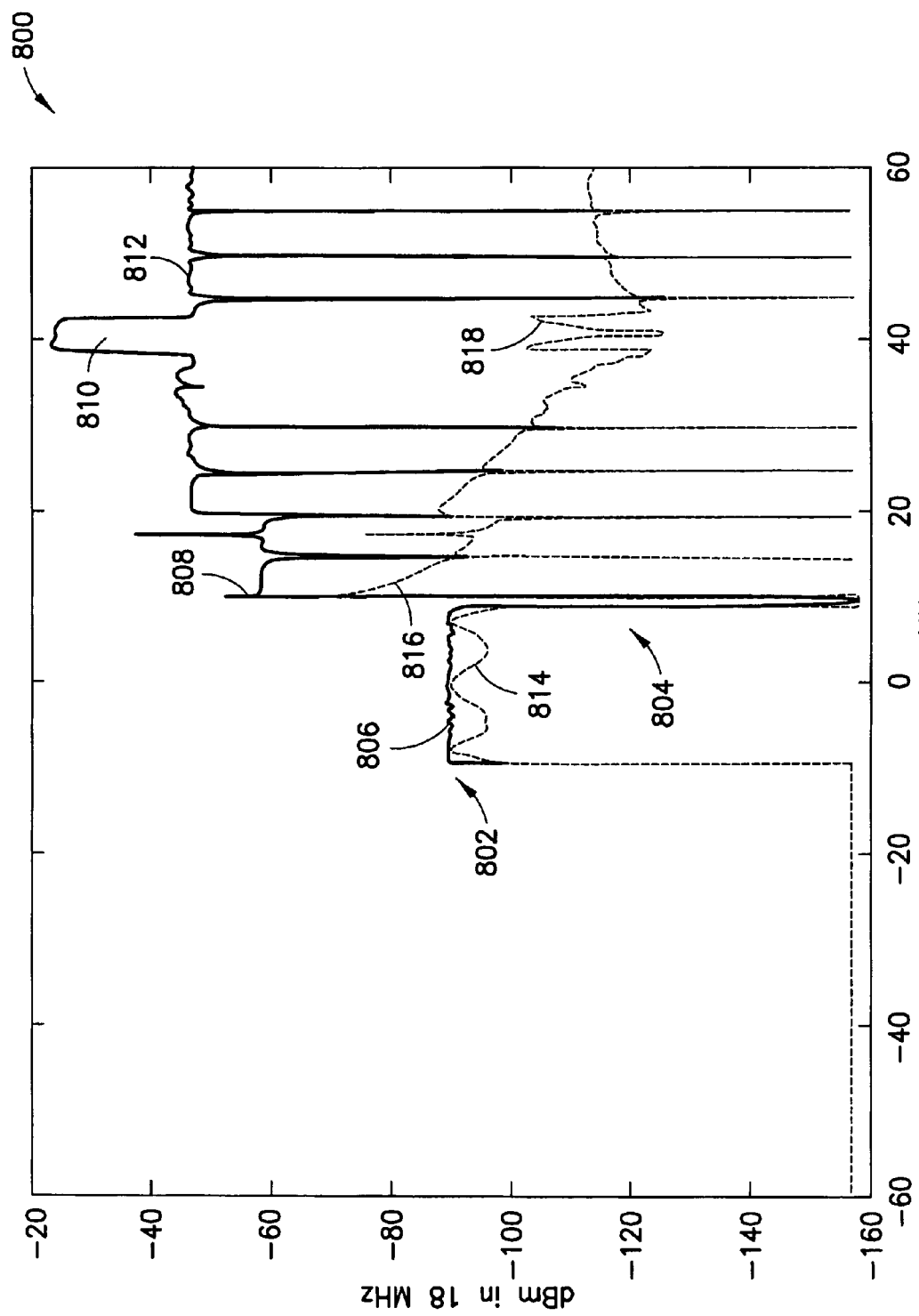
FIG. 8 illustrates a graph showing an input signal subject to interferers that may be processed with an equalizer constructed according to an embodiment of the present invention.

FIG. 8 illustrates a graph 800 showing a received signal 802 at an input of an analog baseband filter, and a filtered signal 804 representing the output of the analog baseband filter. An exemplary analog baseband filter is the analog baseband filter 318 in FIG. 3.

The received signal at the input of the analog baseband filter may comprise a wanted signal component 806, an adjacent channel component 808, a transmit leakage component 810, and an unwanted in-band channel 812. The received signal at the output of the analog baseband filter may comprise a filtered wanted signal component 814, a filtered adjacent channel component 816, and a filtered transmit leakage component 818. The filtered wanted signal component 814 is illustrated here as exhibiting unwanted ripple, caused by processing with the analog baseband filter.

Figure 9:
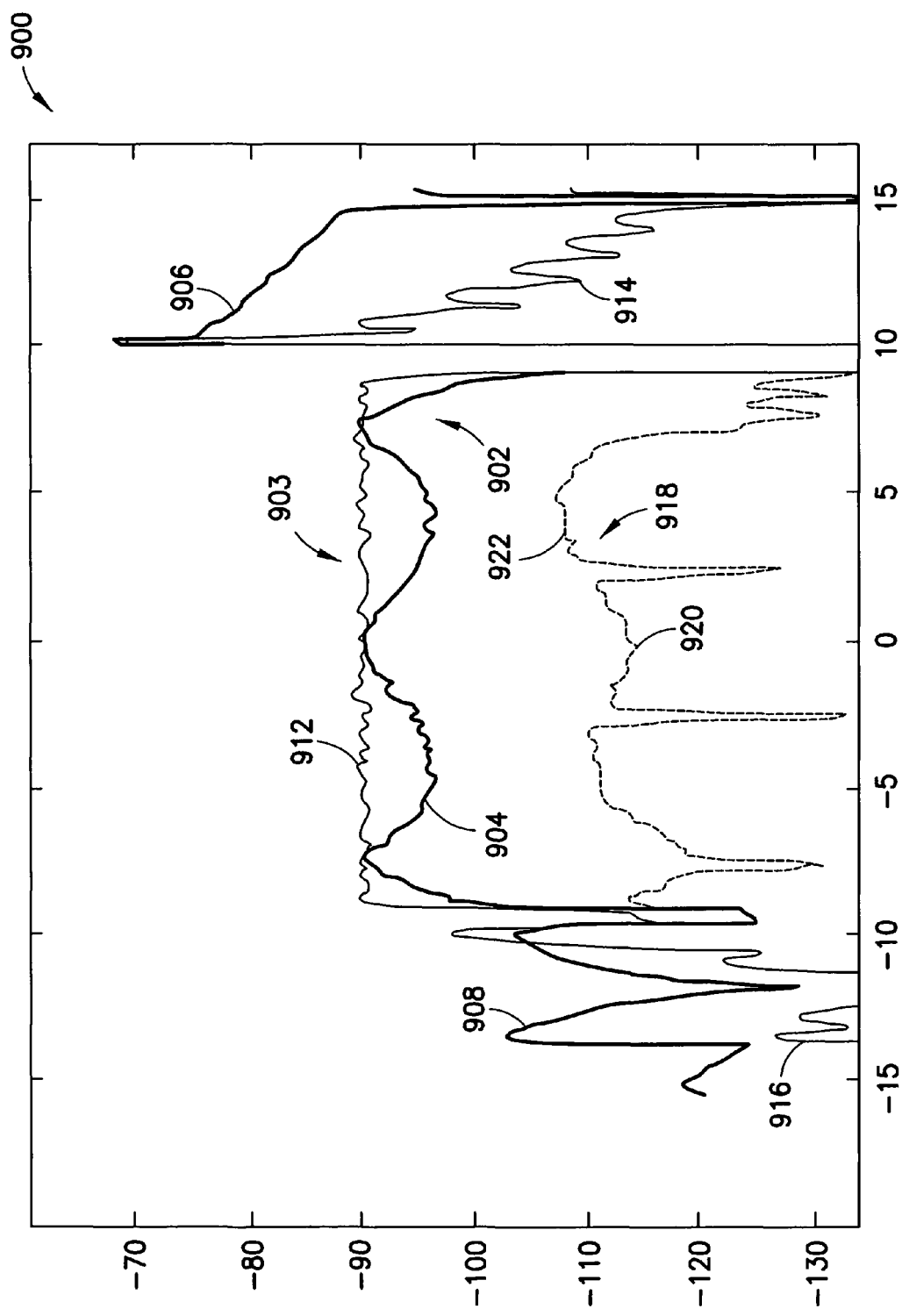
FIG. 9 illustrates a graph showing an output signal overlaid with the results of equalization of the output signal according to an embodiment of the present invention.

FIG. 9 illustrates a graph 900 of a sampled input signal 902 and a sampled output signal 903. The sampled input signal 902 may be the result of an analog-to-digital conversion and sample rate reduction operation of a received signal at the output of an analog baseband filter. An analog-to-digital conversion operation may be implemented, for example, by analog-to-digital converter 320 of FIG. 3, and a sample rate reduction operation may be implemented by poly-phase decimator 328 in FIG. 3.

The sampled input signal may comprise a wanted signal component 904 and a filtered adjacent channel component 906, substantially similar to the filtered adjacent channel component 816 of FIG. 8. The sampled input signal may further comprise an aliased transmit leakage component 908. The aliased transmit leakage component may result from performing the analog-to-digital conversion operation on the filtered transmit leakage component 818 of FIG. 8 using a finite sample rate.

The sampled output signal 903 may be the result of processing the sampled input signal using an equalizer according to an embodiment of the invention. An example for an equalizer is equalizer 332 in FIG. 3. The sampled output signal may comprise an equalized wanted signal component 912, an equalized adjacent channel component 914, and an equalized aliased transmit leakage component 916. The graph 900 also illustrates an error 918 of the sampled output signal. The error 918 is within acceptable limits, and is dominated by alias products, as at 920 and 922, from in-band blocking tones.

Comparing the equalized wanted signal component 912 to the wanted signal component of the received signal 806 of FIG. 8 shows that the spectral shape of the signal has been largely restored, and comparing the equalized adjacent channel component 914 with the filtered adjacent channel component 816 shows a substantial suppression of the equalized adjacent channel component 914 by the equalizer. In addition, comparing the equalized aliased transmit leakage component 916 to the aliased transmit leakage component 908 shows substantial suppression of the equalized transmit leakage component 916.

The frequency response of the equalizer may be symmetrical around 0 Hz, allowing an efficient implementation of independent in-phase and quadrature branches, for example corresponding to the equalizers 328 and 330 of FIG. 3.

While graph 900 illustrates equalized adjacent channel component 914 at a positive frequency and equalized aliased transmit leakage component 916 at a negative frequency, it will be recognized that equalization performed according to various embodiments of the invention may suppress both components efficiently using the same stop band. It should also be noted that both filtered transmit leakage component and filtered adjacent channel component may appear at both positive and negative frequencies.

While various specific embodiments of the invention are described above, it will be recognized that a wide variety of implementations may be employed by persons of ordinary skill in the art and the claims which follow below.

I claim:

1. A method comprising:
retrieving from a computer readable memory a test signal;
measuring a response of a device to the test signal to generate a measured signal;
operating a processor to apply an initial weighting to at least a given frequency component of the measured signal and at least said given frequency component of the test signal; and
operating a processor to iteratively perform the operations of constructing an equalizer based on the weighted signals, testing the performance of the equalizer on the measured signal, and adjusting weighting applied to the measured signal and the test signal,
wherein:
the test signal comprises a plurality of frequency sub-bands within a frequency band,
the measured signal comprises values representing a measurement on each of the plurality of frequency sub-bands,
operating the processor to apply the initial weighting to the measured signal and the test signal comprises constructing a weighting vector comprising a plurality of weighting values to be applied to each of the plurality of sub-bands of the test signal and the measured signal; and
operating the processor to iteratively perform the operations of constructing an equalizer based on the weighted signals comprises, in each successive iteration after the initial weighting is applied, adjusting the weighting comprises increasing a per-sub-band weighting value applied to each sub-band that is subject to the next successive iteration of the operations of constructing the equalizer.

2. The method of claim 1, wherein constructing the equalizer based on the weighted signals comprises constructing the equalizer to map the weighted measured signal to the weighted test signal.

3. The method of claim 1, further comprising constructing a constraint waveform and adding the constraint waveform to the weighted measured signal.

4. The method of claim 1, wherein the test signal is a digital representation of a radio frequency signal and wherein the measured signal is a digitized output of the response of the device.

5. The method of claim 1, wherein the test signal is a cyclic signal exhibiting equal energy at all in-band frequencies and no energy at out-of-band frequencies.

6. The method according to claim 1, wherein for each sub-band subject to a given successive iteration after the initial weighting, the per-sub-band weighting value is proportional to a ratio of an error value to a maximum error value, where the error value is used in the testing of the performance of the equalizer that was performed in the immediately preceding iteration.

7. An apparatus comprising:
a receiver configured to produce a response to a test signal;
a measurement device configured to measure the receiver response to produce a measured signal;
data storage configured to store the test signal and the measured signal; and
a processor configured to:
apply an initial weighting to at least a given frequency component of the measured signal and at least said given frequency component of the test signal, wherein operating the processor to apply the initial weighting to the measured signal and the test signal comprises constructing a weighting vector comprising a plurality of weighting values to be applied to each of a plurality of sub-bands of the test signal and the measured signal; and iteratively perform the operations of constructing an equalizer based on the weighted signals, testing the performance of the equalizer on the measured signal, and adjusting weighting applied to the measured signal and the test signal, wherein operating the processor to iteratively perform the operations of constructing the equalizer based on the weighted signals further comprises, in each successive iteration after the initial weighting is applied, adjusting the weighting comprises increasing a per-sub-band weighting value applied to each sub-band that is subject to the next successive iteration of the operations of constructing the equalizer.

8. The apparatus of claim 7, wherein the receiver comprises a filter and wherein the response of the receiver includes artifacts produced by the filter.

9. The apparatus of claim 8, wherein the filter is an analog baseband filter.

10. The apparatus of claim 8, wherein the artifacts include a ripple in a wanted frequency band of the measured signal.

11. The apparatus of claim 7, wherein the test signal includes adjacent channel interference.

12. The apparatus of claim 7, wherein the processor is configured to test the performance of the equalizer by at least performing a comparison between each sub-band of an equalized measured signal and a corresponding sub-band of a test signal, the equalized measured signal being generated by equalizing the measured signal, the processor being further configured to determine, for each sub-band of the equalized measured signal and the corresponding sub-band of the test signal, an error value based on the comparison, the processor being further configured, for each error value, to determine if the error value meets the predetermined criterion.

13. The apparatus of claim 8, wherein the receiver comprises an analog to digital converter converting an output of the filter to digital form, wherein the response of the receiver comprises a digital representation of a waveform produced by the analog to digital converter and wherein the analog to digital converter introduces aliasing into the response of the receiver.

14. The apparatus according to claim 7, wherein for each sub-band subject to a given successive iteration after the initial weighting, the per-sub-band weighting value is proportional to a ratio of an error value to a maximum error value, where the error value is used in the testing of the performance of the equalizer that was performed in the immediately preceding iteration.

\* \* \* \* \*